Nov. 24, 1959    W. R. HUTCHINS    2,914,765
TEST APPARATUS FOR RADAR RECEIVERS
Filed Nov. 30, 1953
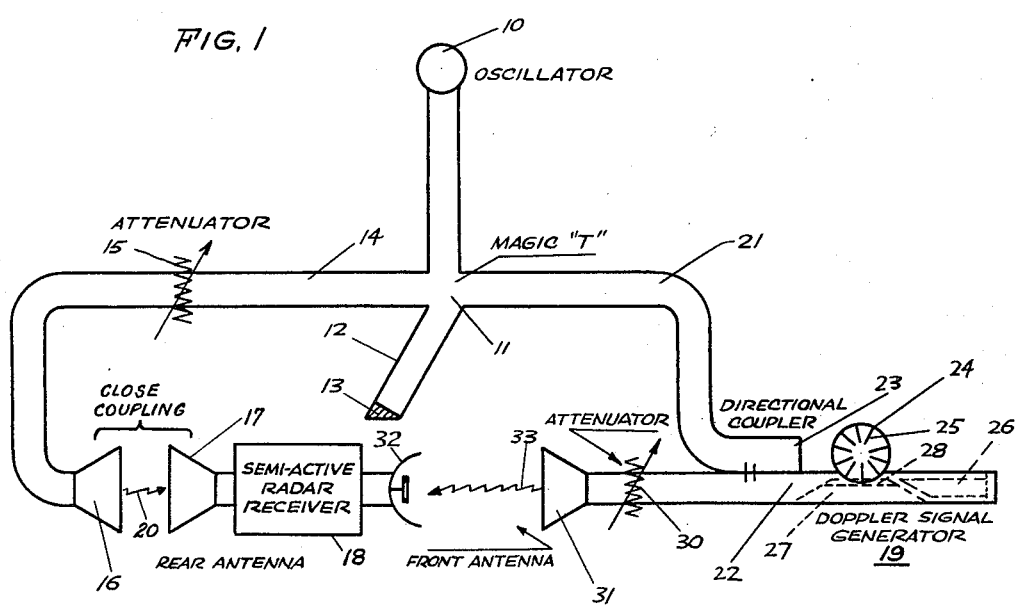
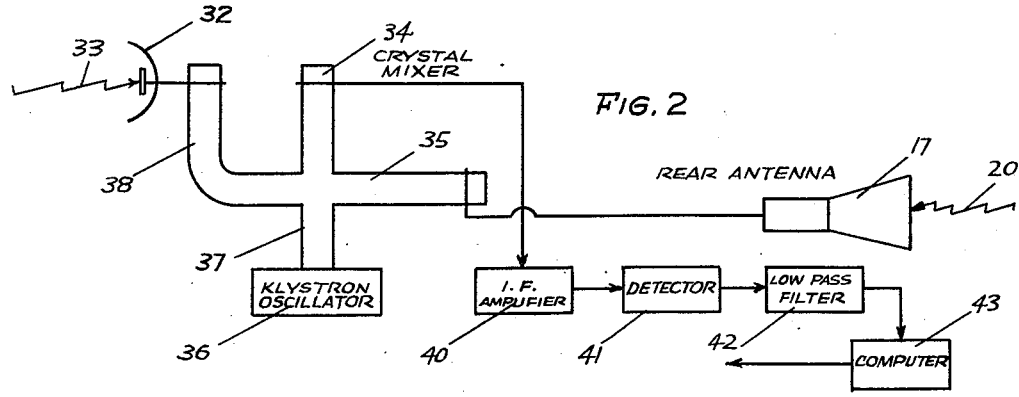
INVENTOR
WILLIAM R. HUTCHINS
BY Elmer J. Gorn
ATTORNEY United States Patent Office 2,914,765
Patented Nov. 24, 1959

2,914,765

TEST APPARATUS FOR RADAR RECEIVERS

William R. Hutchins, Lexington, Mass., assignor to Raytheon Company, a corporation of Delaware Application November 30, 1953, Serial No. 394,920

4 Claims. (Cl. 343—17.7)

This invention relates to test apparatus for a semi-active C.W. radar receiver.

In the semi-active type of radar system, a transmitter is located at one location and a receiver is located at another location, usually between the transmitter and the most likely targets. The receiver receives signals directly from the transmitter on a first receiver antenna and also after reflection from the target on a second receiver antenna and compares the frequency of the received signals to give an output indication. In testing such receivers, it is necessary to supply energy by a first test antenna at the frequency of the transmitter with which the equipment is to be used. In addition, a portion of such energy is applied to a device that shifts its frequency by a predetermined amount to simulate the energy that would be reflected by a target. This energy, after thus being shifted in frequency, is applied to the receiver by a second test antenna or other coupling means. The problem with such testing equipment has been to prevent a portion of the unshifted output of the signal source from reaching the second antenna of the receiver. In the present invention, this is accomplished in part by applying energy to the frequency-shifting device by means of a directional coupler or "Magic T" that prevents unshifted energy from reaching the second test antenna while permitting it to reach the frequency shifting device. This purpose is also accomplished by tightly coupling the output of the unshifted frequency to the first antenna or input of the receiver, either by placing the first test and receiver antennas closely together or by otherwise closely coupling the output of the test frequency source to the first input of the receiver.

Other and further objects, advantages and features of the invention will become apparent from the following description, reference being had to the accompanying drawings, wherein:

Fig. 1 is a schematic diagram of a preferred embodiment of the invention; and

Fig. 2 is a schematic diagram of an embodiment of the type of semi-active radar to be tested by the apparatus of the invention.

In the drawings, reference numeral 10 designates an oscillator such as a klystron and associated apparatus coupled to a transmission line such as a wave guide that applies the energy to one input of a "Magic T" 11 with one arm 12 terminated with resistive material 13. Another arm 14 of the "Magic T" contains a variable attenuator 15 and is terminated in a horn 16 or other radiator of radio frequency energy that propagates a portion of the energy from the oscillator 10 toward a first or rear antenna 17 of the radar receiver 18 under test, as indicated by the arrow 20.

A second branch 21 transmits a part of the output of the oscillator 10 to a Doppler signal generator 19 through a directional coupler 23 or a second "Magic T" for a purpose to be described later. The Doppler signal generator comprises a section of wave guide formed with a slot into which is inserted the edge of a disk 24 of dielectric material into which pieces 25 of conductive material, such as copper, are inserted with their major axes in line with the radius of the disk. The disk 24 is mounted for rotation by a motor. The wave guide 22 is terminated by a block 26 of resistive material. A block 27 of dielectric material is formed with a slot 28 to receive the edge of the rotating disk 24, and is positioned in the wave guide 22 directly below the disk 24. Energy propagated down the wave guide 22 strikes the rotating conductors 25 and is reflected back along the wave guide 22.

The effect is similar to that obtained when radio frequency energy is reflected from an object having a velocity of motion relative to that of the source of the energy. There is a change in the frequency of the energy after striking the conductor 25. This change is increased by forming the block 27 of a material having a high dielectric constant so that the effective wave length of the energy is shortened in passing through the block. This reflected energy is propagated back along the guide 22 through an attenuator 30 to a horn 31 or other antenna that emits energy toward a second antenna 32 of the receiver 18, as indicated by the arrow 33.

The semi-active radar receiver 18 is shown in block diagram form in Fig. 2. Energy from a transmitter is received by the rear antenna 17 and is coupled to a crystal mixer 34 through a wave guide 35. The frequency of this energy is equal to the transmitted frequency less any Doppler frequency shift due to the velocity of the semi-active radar receiver 18 away from the ground station. The output of a local oscillator that may be in the form of a klystron 36 is also applied to the crystal mixer 34 through a section of wave guide 37. The frequency of the output of this oscillator is higher than the received Doppler signal from the rear antenna by some given intermediate frequency such as thirty megacycles. The signal received from the front antenna 32 is also applied to the crystal 34 by means of a section of wave guide 38. The frequency of this last-mentioned signal is equal to the transmitted frequency plus a total Doppler component proportional to the algebraic sum of twice the target speed with respect to the transmitter and the speed of the semi-active radar receiver with respect to the target, if the receiver is mounted on a moving body. The output of the crystal mixer 34 is applied to an I.F. amplifier 40. The bandwidth of this amplifier is sufficient to pass the intermediate frequency and frequencies greater than that frequency by the forward antenna Doppler signal and less than that frequency by the rear antenna Doppler signal. The output of the I.F. amplifier is applied to a detector 41. The resulting signal after passing through a low pass filter 42 is applied to a computer 43 to derive control or indicator voltages.

For test purposes, it is important that no appreciable part of the energy at the original frequency reaches the antenna 32 of the receiver. While the antennas 31 and 32 may be loosely coupled, that is, they may be spaced at a considerable distance apart, the antennas 16 and 17 must be closely coupled so that a minimum of the energy from the antenna 16 reaches the antenna 32 through free space. Means other than a pair of antennas may be used to obtain the desired close coupling of this energy. The directional coupler 23 also serves to prevent energy from the oscillator 10 reaching the antenna 31 through the wave guides 21 and 22 without being shifted in frequency by the Doppler signal generator 19.

The effect of this directional coupler is to permit energy arriving along the wave guide 21 to be propagated to the right along wave guide 22 toward the Doppler signal generator 19 but to prevent such energy from being propagated directly down the guide 22 to the antenna 31. Other hybrid junctions, such as a "Magic T"

or a "rat race" can be used for this purpose. In fact, the use of a "Magic T" for this purpose will result in less power loss. The purpose of the attenuators 15 and 30 is to regulate the amount of power reaching the antennas 17 and 32, respectively.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In apparatus for testing receivers of radar systems of the type having a separately located transmitter and receiver in which the receiver has first and second separate input means and receives a signal directly from the transmitter as a first input and a reflected signal from the target as a second input and compares the frequency of the two signals to derive an output indication, the combination of a source of test signals, means to split the output of this source, means to tightly couple a portion of said output to the first input of the receiver, means to shift the frequency of a second portion of the signal by a predetermined amount, and means to loosely couple only that part of the second portion of the output of the source that is shifted in frequency to the second input of the receiver, wherein said means to couple comprises spaced transmitting and receiving antennae.

2. In apparatus for testing receivers of radar systems of the type having a seperately located transmitter and receiver in which the receiver has first and second separate input means and receives a signal directly from the transmitter as a first input and a reflected signal from the target as a second input and compares the frequencies of the two signals to derive an output indication, the conmbination of a source of test signals, means to split the output of this source, means to tightly couple a portion of said output to the first input of the receiver, means to shift the frequency of a second portion of the signal by a predetermined amount comprising a section of wave guide formed with a slot and a disk of dielectric material having pieces of conductive material set in the periphery thereof and adapted to rotate within the slot formed in the wave guide and means to loosely couple only that part of the second portion of the output of the source that is shifted in frequency to the second input of the receiver, wherein said means to couple comprises spaced transmitting and receiving antennae.

3. In apparatus for testing receivers of radar systems of the type having a separately located transmitter and receiver in which the receiver has first and second separate input means and receives a signal directly from the transmitter as a first input and a reflected signal from the target as a second input and compares the frequencies of the two signals to derive an output indication, the combination of a source of test signals, means to split the output of this source, means to tightly couple a portion of said output to the first input of the receiver, means to shift the frequency of a second portion of the signal by a predetermined amount, and means to apply only that part of the second portion of the output of the source that is shifted in frequency to the second input of the receiver comprising spaced transmitting and receiving antennas, means for coupling said second portion of the signal into said frequency shifting means, and means for coupling the output of said frequency shifting means into said transmitting antenna while substantially preventing coupling of the second portion of the signal before the shift in frequency to said antenna, wherein said means to couple comprises spaced transmitting and receiving antennae.

4. In apparatus for testing receivers of radar systems of the type having a separately located transmitter and receiver in which the receiver has first and second separate input means and receives a signal directly from the transmitter as a first input and a reflected signal from the target as a second input and compares the frequencies of the two signals to derive an output indication, the combination of a source of test signals, means to split the output of this source, means to tightly couple a portion of said output to the first input of the receiver, means to shift the frequency of a second portion of the signal by a predetermined amount comprising a section of wave guide formed with a slot and a disk of dielectric material having pieces of conductive material set in the periphery thereof and adapted to rotate within the slot formed in the wave guide, means to apply only that part of the second portion of the output of the source that is shifted in frequency to the second input of the receiver comprising spaced transmitting and receiving antennas, means for coupling said second portion of the signal into said frequency shifting means, and means for coupling said frequency shifted portion of the signal into said transmitting antenna while substantially preventing coupling of the second portion of the signal before the shift in frequency to said antenna, wherein said means to couple comprises spaced transmitting and receiving antennae.

References Cited in the file of this patent

UNITED STATES PATENTS

| | | |
|---|---|---|
| 2,421,016 | Deloraine | May 27, 1947 |
| 2,549,385 | Rapuano | Apr. 17, 1951 |
| 2,683,855 | Blitz | July 13, 1954 |
| 2,699,547 | Zweigbaum | Jan. 11, 1955 |